US006453831B1

(12) United States Patent
Zeisel

(10) Patent No.: US 6,453,831 B1
(45) Date of Patent: Sep. 24, 2002

(54) METHOD FOR BURNING LUMPY COMBUSTION MATERIAL, ESPECIALLY LIMESTONE, DOLOMITE AND MAGNESITE, AND REGENERATIVE SHAFT FURNACE FOR CARRYING OUT THIS METHOD

(76) Inventor: Peter Zeisel, Overhoffstrasse 3, D-44791 Bochum (DE)

(*) Notice: Subject to any disclaimer, the term of this patent is extended or adjusted under 35 U.S.C. 154(b) by 0 days.

(21) Appl. No.: 09/914,320
(22) PCT Filed: Feb. 17, 2000
(86) PCT No.: PCT/EP00/01296
§ 371 (c)(1),
(2), (4) Date: Feb. 27, 1999
(87) PCT Pub. No.: WO00/51946
PCT Pub. Date: Sep. 8, 2000

(30) Foreign Application Priority Data

Feb. 27, 1999 (EP) ............................................ 99103847

(51) Int. Cl.⁷ ................................ F23D 1/00; F27B 1/02
(52) U.S. Cl. ............................ 110/347; 432/96; 432/99
(58) Field of Search ............................... 432/95, 96, 97, 432/98, 99, 100, 101, 102; 110/347

(56) References Cited

U.S. PATENT DOCUMENTS

| 3,074,706 A | * | 1/1963 | Schmid et al. ................. 263/52 |
| 3,771,946 A | * | 11/1973 | Hofer et al. .................... 432/14 |
| 4,289,482 A | * | 9/1981 | Fussl ............................ 432/96 |
| 4,315,735 A | * | 2/1982 | Fussl et al. .................... 432/25 |
| 4,382,779 A | * | 5/1983 | Fussl ............................ 432/25 |
| 4,534,731 A | | 8/1985 | Fuessl et al. |
| 4,662,841 A | * | 5/1987 | Zeisel .......................... 432/14 |
| 5,167,699 A | * | 12/1992 | Pirklbauer ..................... 75/581 |
| 5,460,517 A | * | 10/1995 | Scheibenreif et al. ......... 432/95 |
| 5,702,246 A | * | 12/1997 | Dam ............................ 432/95 |
| 6,113,387 A | * | 9/2000 | Wilson et al. ................. 432/99 |
| 6,149,425 A | * | 11/2000 | Saddy et al. .................. 432/77 |

FOREIGN PATENT DOCUMENTS

| CN | 345 635 | 5/1960 | |
| DE | 3833069 A1 | * 4/1989 | ............. F27B/1/04 |
| EP | 0 141 198 | 5/1985 | |
| FR | 2 436 346 | 4/1980 | |
| FR | 2 523 569 | 9/1983 | |

OTHER PUBLICATIONS

Zement–Kalk–Gips (Cement–Lime–Gypsum) (1970) "The Burning of Lime in the Parallel–flow Regenerative Shaft Kiln", No. 6, pp. 277–284.

* cited by examiner

Primary Examiner—Ira S. Lazarus
Assistant Examiner—Kenneth B Rinehart
(74) Attorney, Agent, or Firm—Collard & Roe, P.C.

(57) ABSTRACT

A method for burning lumpy combustion material, in particular limestone, dolomite and magnesite, in a regenerative shaft furnace comprising at least two shafts (1, 2) comprised of a preheating zone (A) as well as a combustion zone (B). The shafts are connected below a cooling zone (C) by a transfer channel (3). The combustion air is charged at the head of one shaft (1), heated by hot combustion material as it flows through the preheating zone (A), and brought into contact with fuel before it enters the combustion zone (B). The combustion zone (B) is flowed through by combustion gas produced in the combustion of the fuel. Cooling air is admitted at the lower end of the shaft (1) and, as it flows through the cooling zone (C), heated by hot combustion material exiting from the combustion zone. According to the invention, the combustion air heated in the preheating zone (A) and at least one partial stream of the cooling air heated in the cooling zone (C), are extracted from the shaft (1) and supplied with fuel to a combustion chamber (11), in which the combustion gas for the combustion zone (B) is produced. Furthermore, the object of the invention is also a regenerative shaft furnace for carrying out the method.

14 Claims, 5 Drawing Sheets

Figure 1:
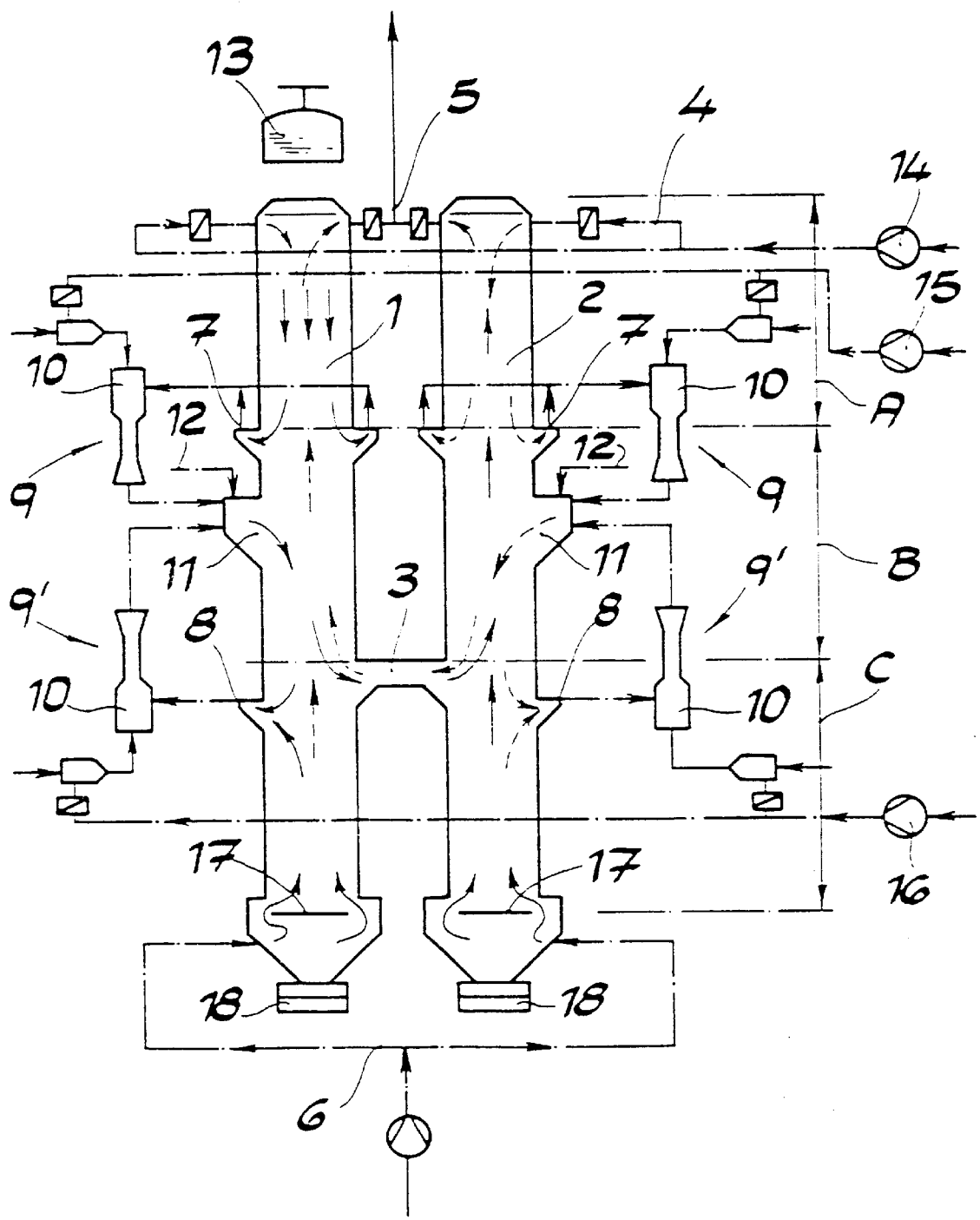

METHOD FOR BURNING LUMPY COMBUSTION MATERIAL, ESPECIALLY LIMESTONE, DOLOMITE AND MAGNESITE, AND REGENERATIVE SHAFT FURNACE FOR CARRYING OUT THIS METHOD

CROSS REFERENCE TO RELATED APPLICATIONS

Applicant claims priority under 35 U.S.C. §119 of European Application No. 99103847.2 filed Feb. 27, 1999. Applicant also claims priority under 35 U.S.C. §120 of PCT/EP00/01296 filed Feb. 17, 2000. The international application under PCT article 21(2) was not published in English.

The invention relates to a method for burning lumpy combustion material, especially limestone, dolomite and magnesite, in a regenerative shaft furnace comprised of at least two shafts that comprise a preheating zone as well as a combustion zone, and which are connected above a cooling zone by a transfer channel, whereby combustion air is delivered to the head of one shaft, heated by hot combustion material as it passes through the preheating zone, and brought into contact with fuel before it enters the combustion zone;

the combustion zone of the shaft is flowed through by combustion gas that is produced as the fuel is being burned;

combustion gas is passed through the transfer channel into the parallel shaft and flows through said parallel shaft from the bottom to the top, with transfer of heat to the combustion material present in the parallel shaft; and cooling air is admitted into the lower end of the shaft and heated as it flows through the cooling zone by the hot combustion material exiting from the combustion zone.

In the process known from the German trade publication ZEMENT-KALK-GIPS [CEMENT-LIME-GYPSUM], No. 6, 1970, pages 277 to 284, which has found wide acceptance in practical life on account of its low energy requirements, the fuel is charged in the shafts via lances, which are suspended into the fill or introduced into hollow spaces located below refractory bridges arranged in the shaft at the end of the preheating zone. The preheating zone of one shaft is used as the regenerator. The combustion air is admitted at the top end of a shaft, flows through the preheating zone in a continuous current, is heated there in the hot fill of combustion material, and comes into contact with the fuel at the mouths of the lances, and combustion occurs. The combustion gas flows in a continuous current from the mouths of the lances to the transfer channel and is then received in the parallel shaft. From there, the combustion gas flows countercurrently in relation to the direction of movement of the combustion material into the preheating zone, in which it transfers excess heat to the combustion material charged in the parallel shaft. At fixed time intervals, after about 10 to 15 minutes in most cases, the feed of combustion air, the discharge of exhaust gas and the feed of fuel are reversed. The combustion air and the fuel are then fed into the parallel shaft and the exhaust gas is extracted at the top side of the first shaft.

In the known process, the cooling air, which is introduced into the underside of the cooling zones of both shafts, does not participate in the combustion process. The cooling air is heated as it flows through the cooling zone and admixed to the combustion gas introduced into the parallel shaft. The cooling air increases the amount of the exhaust gas current, which is extracted at the top side of the parallel shaft, and which, moreover, has a diluting effect. The effect of the admixed cooling air is that the $CO_2$ content of the current of exhaust gas amounts to only 20 to 22% by volume.

Gas currents with a high $CO_2$-content can be used as a valuable material, for example in the production of carbonate. Gas currents with a $CO_2$-content of at least 30% by volume are required in the sugar and soda industries, as well as in the production of calcium precipitate. The exhaust gas collected in the burning of limestone, dolomite and the like in a regenerative shaft furnace is not suitable for such applications.

The invention is based on the problem of further developing the method specified above in such a way that the amount of air can be controlled in a flexible manner and particularly also controlled in a way such that the exhaust gas collected in the burning of limestone, dolomite and the like has a $CO_2$-content in excess of 30% by volume, with no increase in the heat requirement of the regenerative shaft furnace.

Based on the method described above, the problem of the invention is solved according to the invention in that the combustion air heated in the preheating zone, and at least one partial current of the cooling air heated in the cooling air are extracted from the shaft and supplied together with fuel to a combustion chamber, in which the combustion gas for the combustion zone is produced. A very high $CO_2$-content of the exhaust gas withdrawn from the regenerative shaft furnace can be achieved if the total cooling air is supplied to the combustion chamber and used as oxidant for the fuel.

Injectors operated with a preheated propellant gas are preferably used in order to suck the heated combustion air and the heated cooling air from the shaft and supply said heated combustion air and said heated cooling air to the combustion chamber. The propellant is usefully preheated to about 800° to 1000° C. in a central combustion chamber, or in decentralized combustion chambers.

The combustion chamber connected with the shaft for producing the combustion gas required in the combustion zone is in each case equipped with a burner or with a small number of burners, preferably two burners, which simplifies the feed of the fuel. The temperature in the combustion chamber is controlled by the flow of gas sucked off at the top end of the cooling zone. Using the cooling air for the combustion has the advantage that the air ratio of the regenerative shaft furnace can be adjusted and varied. Air ratio denotes in the present case the total amount of air supplied to the regenerative shaft furnace as cooling air and combustion air, based on the minimum amount of air required for a stoichiometric combustion. With a substantially preset volume of the stream of cooling air, the amount of combustion air introduced into the preheating zone can be adjusted in such a way that the air ratio $\lambda$ is smaller than 1.3. With an air ratio $\lambda=1.2$, a $CO_2$-content in the exhaust gas of about 34% by volume is adjusted in the exhaust gas of the regenerative shaft furnace operated according to the invention with natural gas firing and charging of a limestone with a $CaCO_3$-content of about 98% by weight, and a residual $CO_2$-content in the lime of about 1% by weight. The heat requirement of the furnace amounts to about 3,478 kJ/kg lime.

The combustion zone with flow in the same directions and counterflow can be fixed by the way in which the combustion chamber is arranged and the suction opening for the cooling air are positioned. In the combustion zone with continuous flow in the same direction as the combustion material, the combustion gas is guided in the direction of movement of the combustion material, and in the combustion zone with counterflow it is guided against the direction of movement of the combustion material. By changing the ratio of the zones with equi-flow and counterflow it is possible to influence the combustion process and to take into account the reactivity of the combustion material. Further variation possibilities ensue to that extent from the method as defined by the invention.

According to one implementation of the method as defined by the invention, provision is made that the combustion gas is introduced into the shaft above the transfer channel and flows through a combustion zone that reaches from the combustion chamber connected to the shaft, up to the transfer channel. The combustion zone of the shaft operates as a combustion zone with equi-flow, whereas the combustion zone of the parallel shaft is flowed through by the combustion gas countercurrently in relation to the direction of movement of the combustion material.

According to another implementation of the method as defined by the invention, the combustion gas is admitted at about the level of the transfer channel. The partial stream of combustion gas flows through a combustion zone of the shaft located below the transfer channel, with a direction of flow that is the same as the direction of movement of the combustion material, and is extracted from the shaft below the transfer channel with the cooling air heated in the cooling zone, and then recycled into the combustion chamber. The other part of the combustion gas is received in the parallel shaft by way of the transfer channel and flows through the combustion zone of said parallel shaft countercurrently in relation to the direction of movement of the combustion material. By controlling the process in the way described above, the combustion material is burned in a short equi-flow combustion zone located between the combustion chamber and the suction opening located below the transfer channel. However, the predominant part of the combustion process takes place in the combustion zone of the parallel shaft with counterflow.

Another possibility for varying the method as defined by the invention consists in that both shafts are equipped with combustion chambers, which are connected to the shafts at about the level of the transfer channel, whereby fuel is simultaneously admitted to said combustion chambers, together with a partial stream of the combustion air heated in the preheating zone of the first shaft. A part of the combustion gases introduced into the shafts from the combustion chambers flows through an equi-flow zone of the respective shaft located below the transfer channel, i.e. in the same direction as the direction of movement of the combustion material, is extracted from the shaft below the transfer channel with a stream of cooling air heated in the cooling-zone, and then recycled into the combustion chamber connected to the shaft. The other part of the combustion gas flows through a zone of counterflow of the second shaft, i.e. flows countercurrently in relation to the direction of movement of the combustion material. With such an implementation of the method as defined by the invention, the combustion material is simultaneously burned in both shaft in a continuous flow. Furthermore, a counterflow combustion zone is present in the shaft from which the exhaust gas is discharged at the top side, with the combustion material being burned in said counterflow combustion zone by combustion gas guided from the bottom upwards.

The described division in two equi-flow combustion zones and one counterflow combustion zone is achievable also if the combustion air heated in the preheating zone of the first shaft is admitted together with fuel into a combustion chamber that is connected to the transfer channel. A part of the combustion gas exiting from the combustion chamber flows in both shafts through a combustion zone located below the transfer channel, with flow in the same direction as the direction of movement of the combustion material, and is extracted from the shafts below the transfer channel with a stream of the cooling air heated in the cooling zone, and then recycled into the combustion chamber. The other part of the combustion gas flows through a counterflow combustion zone of the second shaft, i.e. it flows countercurrently in relation to the direction of movement of the combustion material.

Furthermore, the object of the invention is a regenerative shaft furnace according to claims 9 to 14 for carrying out the method described above.

The invention is explained in the following with the help of only one exemplified embodiment schematically shown in the drawing, in which:

FIG. 1 shows a plant comprising a regenerative shaft furnace for burning lumpy combustion material, in particular limestone, dolomite, magnesite and the like; and FIGS. 2 to 5 show other embodiments of the regenerative shaft furnace as defined by the invention.

The regenerative shaft furnace of the device shown in FIG. 1 is comprised of the two shafts 1 and 2, which each comprise a preheating zone A, a combustion zone B flowed through by the hot combustion gas, and a cooling zone C. Said shafts are connected with each other above the cooling zone C by a transfer channel 3. Above the preheating zone A of both shafts 1, 2, provision is made for the alternately switchable devices 4, 5 for feeding combustion air and extracting exhaust gas. The devices for feeding cooling air are connected below the cooling zone C of both shafts 1, 2.

At the lower end of the preheating zone A and at the top end of the cooling zone C, the shafts 1, 2 have the gas outlet openings 7, 8, to which the suction devices 9, 9' are connected. The suction devices 9, 9' operate with the injectors 10, which are supplied with preheated propelling air, and connect the gas outlet openings 7, 8 of the shafts 1 and 2, respectively, with a combustion chamber 11 connected to the shaft. Said combustion chamber is preferably equipped with two burners. Gaseous, liquid or solid fuel is supplied via a fuel line 12. Combustion gas produced in the course of the combustion is introduced into the combustion zone B of the shaft 1 or 2.

The regenerative shaft furnace is capable of operating in the suction draw or pressure mode, so that a vacuum or excess pressure prevails in the shafts 1 and 2 depending on the mode. In the exemplified example, provision is made for pressure operation, i.e. all currents of air are supplied by means of pressure blowers. The firing of the shafts 1 and 2 is reversed periodically, which means the firing is reversed at defined, adjustable time intervals, with reversal from the shaft 1 to the shaft 2 and vice versa. During the reversal pauses, the shafts 1 and 2 are charged with combustion material by means of the usual charging equipment, for example by means of the buckets 13.

FIG. 1 shows by the fully drawn directional arrows the feed of air when the combustion gas is admitted at the head of the shaft 1 and the exhaust gas is extracted at the head of the shaft 2. By means of a blower 14, combustion air is pressed into the head of the shaft 1 via a pipeline and an open valve. The feed line located at the furnace head of the shaft 2 is closed by a valve. The air introduced into the shaft 1 flows through the fill of combustion material in the preheating zone A downwards, and is heated in this process to about 700° to 800° C. The heated combustion air is sucked from the shaft 1 by the suction device 9 and fed into the combustion chamber 11. The suction device 9 has an injector 10 that is supplied with a preheated stream of air serving as the propelling medium. The propelling medium is fed by means of a blower 15. The propelling medium is received in a central combustion chamber via a pipeline, or in combustion chambers arranged in a decentralized manner, where it is preheated with fuel to temperatures ranging from 800° to 1000° C. Provision is made in the feed line for check valves, which are alternately opened and closed.

The cooling air introduced into the cooling zone C of the shaft 1 on the underside is heated as it flows through the cooling zone C. It is sucked from the shaft 1 alone or with an equi-flow of gas by means of the suction device 9'. The suction device 9' is equipped with an injector 10 as well, which is supplied with a preheated propelling medium. The propelling medium is supplied by means of a blower 16. The propelling medium is received in a combustion chamber via a pipeline and an open valve, where it is preheated with fuel to a temperature of 800° to 1000° C. in a central or decentralized manner. The temperature of the combustion chamber 11 can be controlled via the amount of circulating gas conveyed by the injector 10 into the combustion chamber, said circulating gas consisting of cooling air and gas flowing in the same directions. All currents of air blown into the shaft 1, that is to say the $CO_2$ escaping from the combustion material in the combustion zone B, and the combustion gas produced in the course of combustion in the combustion chamber 11, are received in the parallel shaft 2 via the transfer channel 3, where said currents flow countercurrently to the combustion material to the head of the parallel shaft 2. In the combustion zone B of the parallel shaft 2, the gases give off heat countercurrently in relation to the deacidifying combustion material. The excess heat from the combustion material contained in the exhaust gas is stored in the preheating zone A of the parallel shaft 2. By way of an open valve located at the head of the furnace, and a pipeline, the exhaust gas flows with a temperature of about 100° C. to a dust removal plant not shown.

The burned, finished combustion material is discharged from the regenerative shaft furnace via the gates 18 and unloaded in silos installed below. After the adjustable burning time, the so-called burning period has expired, the feed of fuel to the shaft 1 is shut down and the shaft 2 becomes the combustion shaft. The flow of gas then adjusting in the shaft is indicated by the dashed directional arrows.

In the exemplified embodiment of FIG. 1, both shafts 1 and 2 have a combustion chamber 11, which is located above the transfer channel 3 on the periphery of the shafts 1 and 2. The combustion gas introduced into the shaft 1 or 2 above the transfer channel 3 flows with through a combustion zone B with equi-flow, extending from the combustion chamber 11 connected to the shaft, up to the transfer channel 3. The combustion zone B of the parallel shaft 2, on the other hand, operates as a combustion zone with counterflow.

Figure 2:
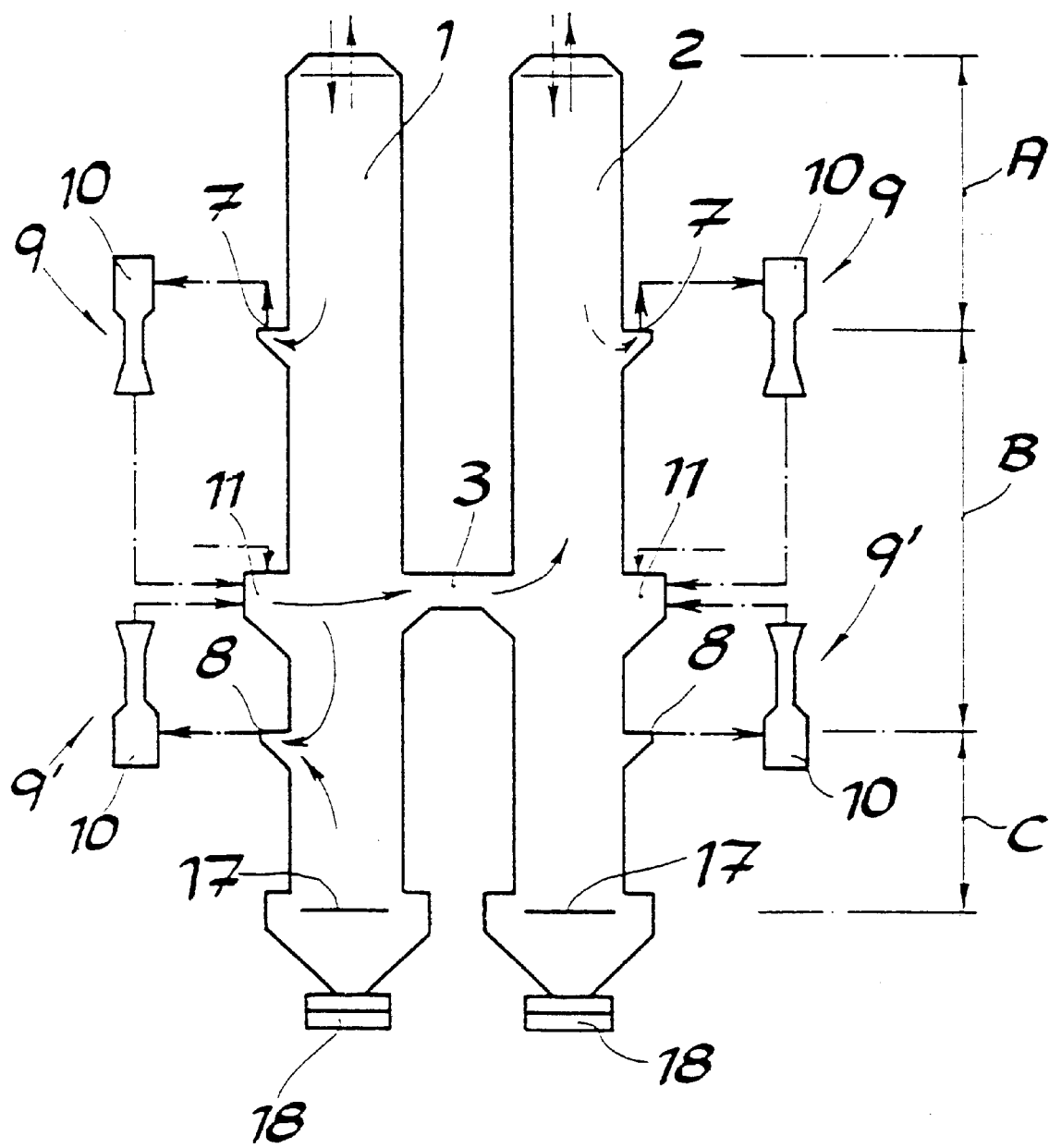

In the exemplified embodiment of FIG. 2, both shafts 1 and 2 have a combustion chamber 11. Said combustion chambers are arranged at about the level of the transfer channel 3 on the periphery of the shafts 1 and 2 and are connected by the suction devices 9 and 9' with the gas outlet openings 7 and 8 of the shafts 1 and 2, said gas outlet openings being located above and below the transfer channel. A partial stream of the combustion gas flows through a combustion zone B of the shaft 1 located below the transfer channel 3 in the same direction of flow as the direction of movement of the combustion material, and is extracted from the shaft 1 below the transfer channel 3 with the help of the cooling air heated in the cooling zone C, and then recycled into the combustion chamber 11. The other part of the combustion gas is received in the parallel shaft 2 via the transfer channel 3 and flows through the combustion zone B of the parallel shaft 2 countercurrently in relation to the direction of movement of the combustion material. The equi-flow combustion zone is shorter than the combustion zone with counterflow. By fixing the proportions of equi-flow and counterflow it is possible to influence the combustion process and to take into account the reactivity of the combustion material.

Figure 3:
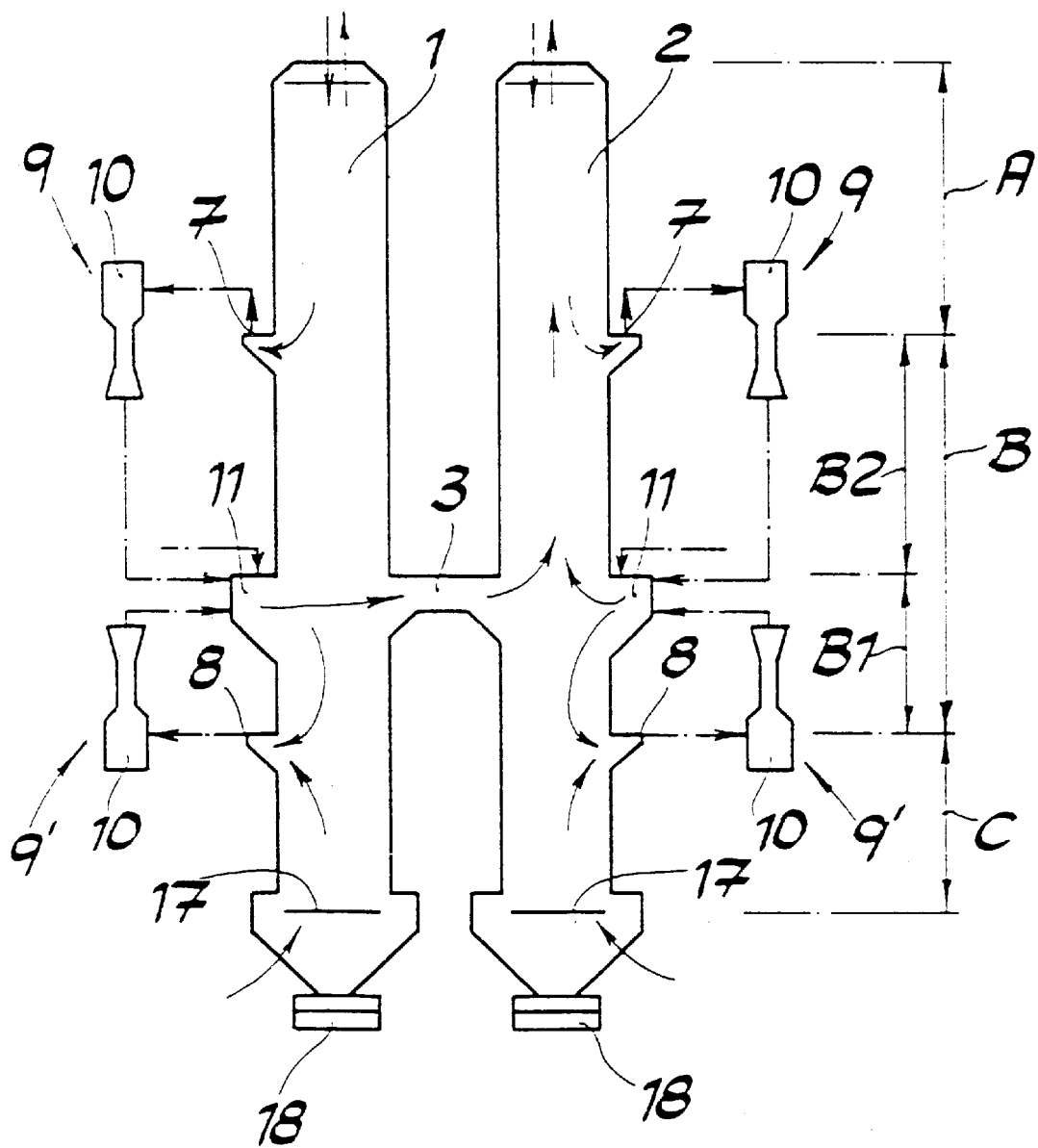

In the exemplified embodiment of FIG. 3, both shafts 1 and 2 each comprise a combustion chamber 11 as well, said combustion chambers being located at about the level of the transfer channel 3 on the periphery of the shafts 1 and 2. However, as opposed to the embodiments described above, the combustion chambers 11 and the suction devices 9' associated with the cooling zone C are always operated simultaneously. Fuel as well as a partial stream of the combustion air heated in the preheating zone A of the first shaft 1 are admitted to each of the combustion chambers 11. A part of the combustion gases introduced from the combustion chambers 11 into the shaft 1 and 2 flows through an equi-flow combustion zone B1 of the respective shaft 1 or 2 located below the transfer channel 3, i.e. in the same direction as the direction of movement of the combustion material, and is extracted from the shaft below the transfer channel 3 with a stream of cooling air heated in the cooling zone C, and then recycled into the combustion chamber 11 connected to the shaft. Therefore, a equi-flow combustion zone B1 is always present in both shafts 1 and 2, where the combustion material is burned by a stream of gas guided in the direction of movement of the combustion material. The other part of the combustion gas flows through a counterflow combustion zone B2 of the second shaft 2, i.e. countercurrently in relation to the direction of movement of the combustion material, and exits from the shaft 2 by way of the outlet located on the side of the head. Only the valves on the shafts 1 and 2 are reversed at defined time intervals. Following such a reversal, the combustion air of the preheating zone A of the shaft 2 is heated and the exhaust gas is extracted at the head of the shaft 1.

Figure 4:
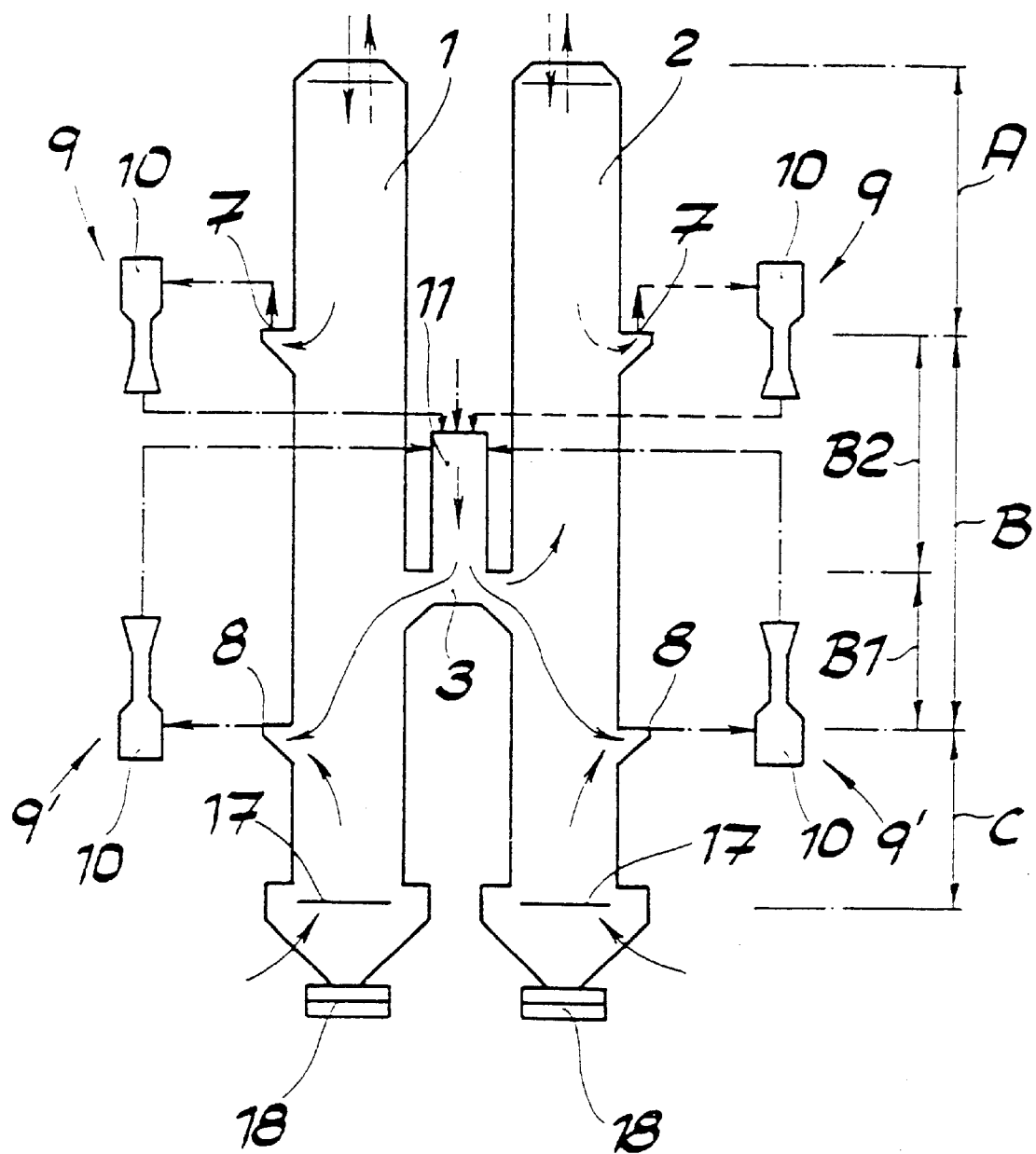

In the exemplified embodiment shown in FIG. 4, a combustion chamber 11 is connected to the transfer channel 3. Said combustion chamber is connected by the suction devices 9, 9' to gas outlet openings of the two shafts 1 and 2 located above and below the transfer channel 3. The combustion air heated in the preheating zone A of the first shaft 1 is supplied together with fuel to the combustion chamber 11 connected to the transfer channel 3. A part of the combustion gas exiting from the combustion chamber 11 flows in both shafts 1 and 2 through an equi-flow combustion zone B1 located below the transfer channel 3, i.e. in the same direction of flow as the direction of movement of the combustion material, is extracted from the shafts 1 and 2 below the transfer channel 3 with a stream of cooling air heated in the cooling zone C, and is then recycled into the combustion chamber 11. The other part of the combustion gas flows through a counterflow combustion zone B2 of the second shaft 2 against the direction of movement of the combustion material. Only the valves located at the top end of the shafts 1 and 2 are reversed at defined time intervals, so that upon expiration of the combustion period, the combustion air is reversed from shaft 1 to shaft 2, and the exhaust gas that previously exited from shaft 2 is now discharged from the shaft 1.

Figure 5:
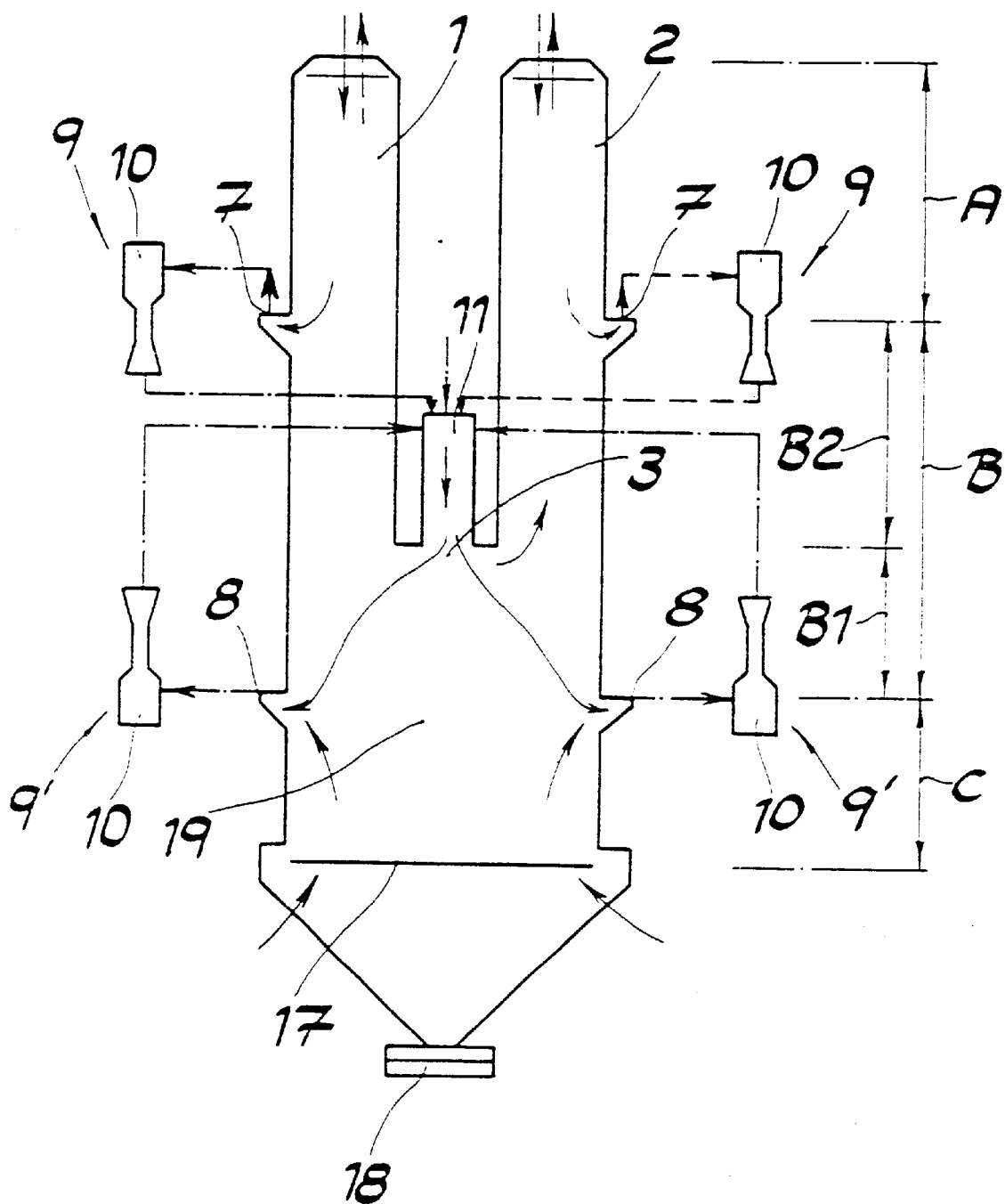

In the exemplified embodiment of FIG. 5, the shafts 1 and 2 comprise a common cooling shaft 19 containing the cooling zone C, and above the cooling zone C an equi-flow combustion zone B1 flowed through by the combustion gas with the direction of flow being the same as the direction of movement of the combustion material. Furthermore, the shafts 1 and 2, at the lower ends of their preheating zones A, and the cooling shaft 19 at the top end of the cooling zone C comprise the gas outlet openings 7, 8, to which the suction devices 9 and 9' are connected. The suction devices 9, 9' are connected with a combustion chamber 11 supplied with fuel. Said combustion chamber is connected to the transfer channel 3 and serves for producing the combustion gas introduced into the combustion zones B. The conditions of flow so obtained are the same as those described above with the help of FIG. 4.

What is claimed is:

1. A method for burning lumpy combustion material, comprising limestone, dolomite and magnesite in a regenerative shaft furnace comprised of at least two shafts (1, 2) which comprise a preheating zone (A), a combustion zone (B) and which are connected with each other above a cooling zone (C) by a transfer channel (3); whereby combustion air is admitted at the head of one shaft (1), heated by hot combustion material as the combustion air flows through the preheating zone (A), and brought into contact with fuel before the combustion air enters the combustion zone (B);

the combustion zone (B) of the one shaft (1) is flowed through by combustion gas produced in the combustion of the fuel;

combustion gas is passed through the transfer channel (3) into the parallel shaft (2) and flows through said parallel shaft from the bottom to the top while transferring heat to the combustion material present in the parallel shaft (2); and cooling air is supplied to the lower end of the one shaft (1) and is heated as the cooling air flows through the cooling zone (C) by the hot combustion material exiting from the combustion zone (B);

characterized in that combustion air heated in the preheating zone (A), and a partial stream of the cooling air heated in the cooling zone (C) are extracted from the one shaft (1) and supplied with fuel to a combustion chamber (11) in which the combustion gas for the combustion zone (B) is produced.

2. The method according to claim 1, characterized in that the heated combustion air and the heated cooling air are sucked from the one shaft (1) with injector (10) and supplied to the combustion chamber (11), and that the injectors (10) are operated with a preheated propellant gas.

3. The method according to claim 1, characterized in that the temperature in the combustion chamber (11) is controlled by a stream of gas aspirated at a top end of the cooling zone (C).

4. The method according to claim 1, characterized in that the amount of combustion air supplied to the preheating zone (A) is adjusted in such a way that the air ratio $\lambda$ of the total amount of air supplied to the regenerative shaft furnace, and the minimum amount of air required for a stoichiometric combustion of the fuel is smaller than 1.3.

5. The method according to claim 1, characterized in that the combustion gas in introduced into the one shaft (1) above the transfer channel (3) and flows through a combustion zone (B) extending from the combustion chamber (11) connected to the shaft, up to the transfer channel (3).

6. The method according to claim 1, characterized in that the combustion gas is introduced at about the level of the transfer channel (3); that a partial stream of the combustion gas flow through an equi-flow combustion zone (B1) of the one shaft (1) located below the transfer channel (3) in the same direction of flow as the direction of movement of the combustion material, and is extracted from the one shaft (1) below the transfer channel (3) with the cooling air heated in the cooling zone (C), and recycled into the combustion chamber (11); and that another part of the combustion gas is received in the parallel shaft (2) by way of the transfer channel (3) and flows through a counterflow combustion zone (B2) of the parallel shaft (2) countercurrently in relation to the direction of movement of the combustion material.

7. The method according to claim 1, characterized in that both shafts (1, 2) are equipped with combustion chambers connected to the shafts (1, 2) at about the level of the transfer channel (3), and fuel and a partial stream of the combustion air heated in the preheating zone (A) of the one shaft (1) are simultaneously admitted to each of said shafts; that a part of the combustion gases introduced into the shafts (1, 2) from the combustion chambers (11) flows in each case through an equi-flow combustion zone (B1) of the respective shaft with the same direction of flow as the direction of movement of the combustion material, and is extracted from the shaft below the transfer channel (3) with a stream of cooling air heated in the cooling zone (C), and recycled into the combustion chamber (11) connected to the shaft; and that another part of the combustion gases flows through a counterflow combustion zone (B2) of the second shaft (2) countercurrently in relation to the direction of movement of the combustion material.

8. The method according to claim 1, characterized in that the combustion air heated in the preheating zone (A) of the one shaft (1) is supplied with fuel to a combustion chamber (11), the latter being connected with the transfer channel (3); that a part of the combustion gas exiting from the combustion chamber (11) flows through an equi-flow combustion zone (B1) located below the transfer channel (3), flowing in the same direction of flow as the direction of movement of the combustion material; is extracted below the transfer channel (3) with a stream of cooling air heated in the cooling zone (C), and then recycled into the combustion chamber (11); and that the other part of the combustion gas flows through a counterflow combustion zone (B2) of the second shaft (2), flowing countercurrently in relation to the direction of movement of the combustion material.

9. A regenerative shaft furnace for carrying out the method according to claim 1, comprising at least two shafts (1, 2) each comprising a preheating zone (A), a combustion zone (B) flowed through by hot combustion gas, and a cooling zone (C), and being connected above the cooling zone (C) by a transfer channel (3);

reversible switching devices (4, 5) located above the preheating zone (A) of both shafts (1, 2) for feeding combustion air and for extracting exhaust gas; and devices (6) located below the cooling zone (C) of both shafts (1, 2) for feeding cooling air;

characterized in that the shafts (1, 2) comprise suction gas outlet openings (7, 8) located at the lower end of the preheating zone (A) and at the top end of the cooling zone (C), to which gas outlet openings the suction devices (9, 9') are connected; and that the suction devices (9, 9') are connected with at least one combustion chamber (11) supplied with fuel for producing the combustion gas introduced into the combustion zones (B).

10. The regenerative shaft furnace according to claim 9, characterized in that both shafts (1, 2) comprise a combustion chamber (11) arranged above the transfer channel (3) on the periphery of the shafts (1, 2).

11. The regenerative shaft furnace according to claim 9, characterized in that both shafts comprise a combustion chamber (11) arranged at about the level of the transfer channel (3) on the periphery of the shafts (1, 2) and connected by suction devices (9, 9') with gas outlet openings (7, 8) of the shafts (1, 2) arranged above and below the transfer channel.

12. The regenerative shaft furnace according to claim 9, characterized in that a combustion chamber (11) is connected to the transfer channel (3), said combustion chamber being connected by suction devices (9, 9') with gas outlet openings (7, 8) of both shafts (1, 2) arranged above and below the transfer channel (3).

13. A regenerative shaft furnace for carrying out the method according to claim 1, comprising at least two shafts (1, 2) comprising a preheating zone (A) and a combustion zone (B) flowed through by hot combustion gas, and being connected above the cooling zone (C) by a transfer channel (3);

alternately switchable devices (4, 5) located above the preheating zone (A) of both shafts (1, 2) for feeding combustion air and extracting exhaust gas; and devices (6) located below the cooling zone (C) for feeding cooling air;

characterized in that the shafts (1, 2) comprise a common cooling shaft (19) containing the cooling zone (C) and above the cooling zone (C) an equi-flow combustion zone (B1) flowed through by combustion gas in the same direction of flow as the direction of movement of the combustion material; that the shafts (1, 2) and the cooling shaft (19) comprise gas outlet openings (7, 8) located at the lower end of their preheating zones (A) of said it shafts and at the top end of the cooling zone (C), with suction devices (9, 9') being connected to said gas outlet openings; and that the suction devices (9, 9') are connected with a combustion chamber (11) supplied with fuel, said combustion chamber being connected to the transfer channel (3) and serving for producing the combustion gas introduced into the combustion zones (B).

14. The regenerative shaft furnace according to claim 9, characterized in that the suction devices (9, 9') comprise injectors (10) supplied with a preheated propellant gas.

* * * * *